US012145079B2

(12) United States Patent
Padua et al.

(10) Patent No.: US 12,145,079 B2

(45) Date of Patent: Nov. 19, 2024

(54) SIZE CHANGING ROOM ILLUSION SYSTEM AND METHOD

(71) Applicant: Universal City Studios LLC, Universal City, CA (US)

(72) Inventors: Andrew Padua, Orlando, FL (US); Zane Jensch, Orlando, FL (US); Meridith Head, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 392 days.

(21) Appl. No.: 17/729,960

(22) Filed: Apr. 26, 2022

(65) Prior Publication Data

US 2023/0241528 A1 Aug. 3, 2023

Related U.S. Application Data

(60) Provisional application No. 63/305,561, filed on Feb. 1, 2022.

(51) Int. Cl.

*A63J 15/00* (2006.01)
*H05B 45/10* (2020.01)

(Continued)

(52) U.S. Cl.

CPC .............. *A63J 15/00* (2013.01); *H05B 45/10* (2020.01); *H05B 47/115* (2020.01); *H05B 47/155* (2020.01)

(58) Field of Classification Search

CPC ..... A63J 15/00; H05B 47/115; H05B 47/155; H05B 45/10; F21V 33/006

(Continued)

(56) References Cited

U.S. PATENT DOCUMENTS 4,428,575 A * 1/1984 Kerr ........................ A63J 15/00 472/74

5,699,243 A * 12/1997 Eckel ..................... H05B 47/11 315/159

(Continued)

OTHER PUBLICATIONS

Sillano, Eryka, The Many Uses of Scrim in Theatre Sets, Specialty Theatre—Passion for Performance, Oct. 19, 2017, pp. 1-4, https://specialtytheatre.com/uses-of-scrim-in-theatre-sets/.

(Continued)

*Primary Examiner* — Kien T Nguyen

(74) *Attorney, Agent, or Firm* — Fletcher Yoder, P.C.

(57) ABSTRACT

A system for performing a shrinking room illusion includes a first group of perforated optics panels defining a first interior space. First lighting is configured to illuminate the first group of perforated optics panels from the first interior space. The system also includes a second group of panels defining a second interior space, wherein the first group of perforated optics panels are nested within the second interior space. Second lighting is configured to illuminate the second group of panels from within the second interior space and positioned beyond the first interior space. A controller of the system is configured to control the first lighting and the second lighting to transition between illuminating the first group of perforated optics panels and illuminating the second group of panels such that a visual illusion of transitioning between the first interior space and the second interior space is provided.

20 Claims, 7 Drawing Sheets

(51) Int. Cl.
*H05B 47/115* (2020.01)
*H05B 47/155* (2020.01)

(58) Field of Classification Search
USPC .......................................... 472/58, 61, 136
See application file for complete search history.

(56) References Cited

U.S. PATENT DOCUMENTS

| | | | |
|---|---|---|---|
| 8,035,614 | B2 | 10/2011 | Bell et al. |
| 8,115,763 | B2 | 2/2012 | Woop et al. |
| 8,525,829 | B2 | 9/2013 | Smithwick et al. |
| 8,825,225 | B1 | 9/2014 | Stark et al. |
| 8,857,994 | B2 | 10/2014 | Smithwick |
| 8,976,323 | B2 | 3/2015 | Smithwick et al. |
| 9,219,910 | B2 | 12/2015 | Reichow et al. |
| 9,557,547 | B2 | 1/2017 | Choi et al. |
| 9,581,962 | B1 | 2/2017 | Duffy |
| 9,704,267 | B2 | 7/2017 | Kim et al. |
| 9,916,794 | B2 | 3/2018 | Smithwick |
| 10,627,079 | B2 | 4/2020 | Joseph et al. |
| 10,719,995 | B2 | 7/2020 | Goslin |
| 2003/0054894 | A1 | 3/2003 | Fiedler |
| 2008/0146356 | A1 | 6/2008 | Gaughan |
| 2011/0310121 | A1 | 12/2011 | Baron |
| 2016/0129365 | A1 | 5/2016 | Crowder et al. |
| 2018/0024373 | A1 | 1/2018 | Joseph et al. |

OTHER PUBLICATIONS

Making Magic with Scrim Projections, ShowTex, Jul. 11, 2020, pp. 1-7, https://www.showtex.com/en/blog/buyers- guide-fabrics/making-magic-scrim-projections.

3D Scrim Projection: The Challenge, Mar. 2019, pp. 1-4, https://www.showtex.com/en/projects/special-effects/challenge.

Projecting on Chameleon™ scrim, Accessed May 9, 2022, pp. 1-8, https://www.studio-productions-inc.com/white_papers/wp_projection_scrim.html.

A Scrim Special Effect Question, ControlBooth, Oct. 11, 2004, pp. 1-3, https://www.controlbooth.com/threads/a-scrim-special-effect-question. 1430/.

Scrims and Muslins, QSD, Accessed May 9, 2022, pp. 1-5, https://qsd-inc.com/stage-curtains-2/curtain-fabrics/scrims-muslins/.

How To Get Scrim Effects, Accessed May 9, 2022, pp. 1-8, https://studio-productions-inc.com/white_papers/wp_scrim_effects.html.

Lai, Yun, et al., Jun. 22, 2009, pp. 1-23, Illusion Optics: The Optical Transformation of an Object into Another Object, vol. 102, Iss. 25, Department of Physics, The Hong Kong University of Science and Technology, Clear Water Bay, Kowloon, Hong Kong, China.

Two Way Glassless Mirror (Scrim), En Pointe Enterprises, Apr. 23, 2013, pp. 1-7, https://en-pointe.com/product/two-way-glassless-mirror-scrim/.

https://www.signsofintelligence.net/pick-your-perfect-perf/, accessed Sep. 20, 2021.

https://www.perforated-sheet.com/holepattern/round-hole-perforated-sheet.html, accessed Sep. 20, 2021.

http://oceanswebsite.com/Amesroom1.html—The Ames Room Illusion, accessed Sep. 20, 2021.

https://mattsdesignsblog.wordpress.com/2021/03/11/the-shrinking-room/—The Shrinking Room _ MattsDesigns Blog, Mar. 11, 2021.

https://www.flickr.com/photos/lanibzlicious/2346966100, accessed Sep. 20, 2021.

PCT/US2023/012024 International Search Report and Written Opinion mailed Jun. 5, 2023.

* cited by examiner

SIZE CHANGING ROOM ILLUSION SYSTEM AND METHOD

CROSS-REFERENCE TO RELATED APPLICATION

This application claims priority to U.S. Provisional Application No. 63/305,561, filed Feb. 1, 2022, entitled "SIZE CHANGING ROOM ILLUSION SYSTEM AND METHOD," the disclosure of which is incorporated by reference in its entirety for all purposes.

BACKGROUND

The present disclosure relates generally to a system for use in interactive environments, such as a game environment or an amusement park. More specifically, embodiments of the present disclosure relate to an accessible interactive system that facilitates interactive effects, such as a room shrinking effect. Amusement parks typically include various attractions that provide unique experiences for guests. For example, an amusement park may include various rides and show performances. As technology has continued to improve, such attractions have increased in sophistication and complexity. There is a corresponding increase in expectations regarding entertainment quality of attractions and a need for more immersive effects.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a system for performing a shrinking room illusion is provided in accordance with the present disclosure. The system includes a first group of perforated optics panels defining a first interior space. First lighting is configured to illuminate the first group of perforated optics panels from the first interior space. The system also includes a second group of perforated optics panels defining a second interior space, wherein the first group of perforated optics panel are nested within the second interior space. Second lighting is configured to illuminate the second group of perforated optics panels from within the second interior space and positioned beyond the first interior space. A controller of the system is configured to control the first lighting and the second lighting to transition between illuminating the first group of perforated optics panels and illuminating the second group of perforated optics panels such that a visual illusion of transitioning between the first interior space and the second interior space is provided.

In an embodiment, a method for performing a shrinking room illusion is provided in accordance with the present disclosure. The method includes using a first lighting to illuminate a first group of perforated optics panels, wherein the first group of perforated optics panels defines a first interior space, and wherein the first lighting is disposed within the first interior space. Further, the method includes using a second lighting to illuminate a second group of perforated optics panels, wherein the second group of perforated optics panels defines a second interior space, wherein the first group of perforated optics panel are nested within the second interior space, and wherein the second lighting is disposed within the second interior space and beyond the first interior space. Additionally, the method includes using a controller to control the first lighting and the second lighting to transition between illuminating the first group of perforated optics panels and illuminating the second group of perforated optics panels such that a visual illusion of transitioning between the first interior space and the second interior space is provided.

In an embodiment, a non-transitory computer-readable storage medium coupled to one or more processors is provided in accordance with the present disclosure. The non-transitory computer-readable storage medium includes instructions stored thereon which, when executed by the one or more processors, cause the one or more processors to perform operations including using a first lighting to illuminate a first group of perforated optics panels, wherein the first group of perforated optics panels defines a first interior space, and wherein the first lighting is located in the first interior space. The operations further include using a second lighting to illuminate a second group of perforated optics panels, wherein the second group of perforated optics panels defines a second interior space, wherein the first group of perforated optics panel are nested within the second interior space, and wherein the second lighting is located in the second interior space and beyond the first interior space. Additionally, the operations include using a controller to control the first lighting and the second lighting to transition between illuminating the first group of perforated optics panels and illuminating the second group of perforated optics panels such that a visual illusion of transitioning between the first interior space and the second interior space is provided.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

It has become more common to create interactive environments in amusement parks, which include scenery, special effects, audiovisual features, and other media elements that improve a visitor's experience. Such interactive environments may provide immersion in an experience that supports a particular narrative of the environment. It is now recognized that an improved shrinking or growing (size changing) room illusion is desirable for providing further immersion in certain experiences and narratives. In accordance with the present disclosure, a size changing room system may include a series of interior spaces with the first interior space nested within the second interior space, the second interior space nested within the third interior space, and so on. Each of the interior spaces may be defined by a group of perforated optics panels. A perforated optics panel may be defined as a panel (e.g., layer, screen, sheet, barrier, wall) with perforations disposed throughout and spaced apart such that, depending on a light source location, the perforated optics panel can appear to be transparent or solid.

Figure 1:
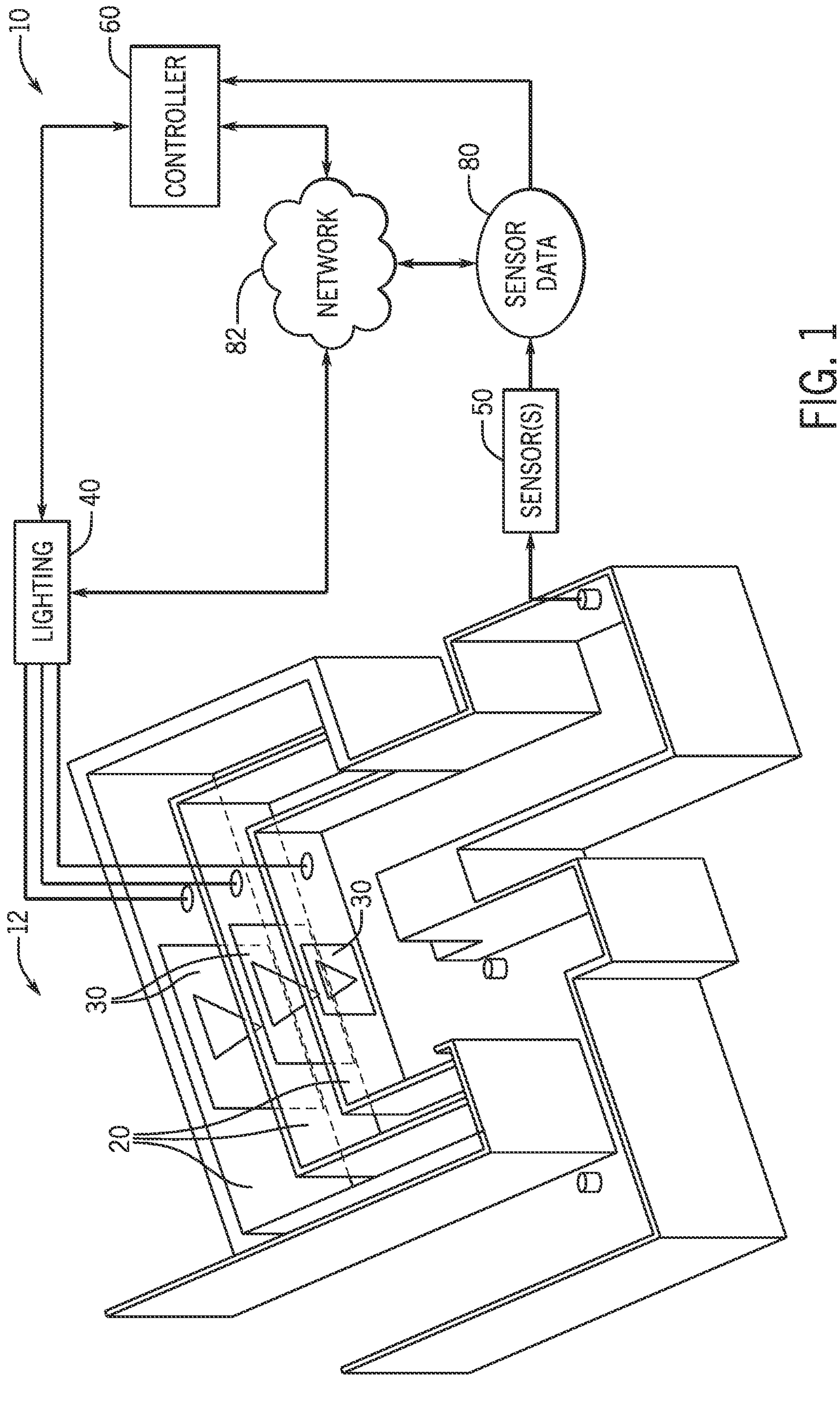
FIG. 1 is a perspective view of an embodiment of a shrinking or growing room system that includes groups of perforated optics panels, lighting, sensors, and a controller, wherein overhead or roof portions are not shown to facilitate viewing an inside of the system, in accordance with an embodiment of the present disclosure.
Figure 2:
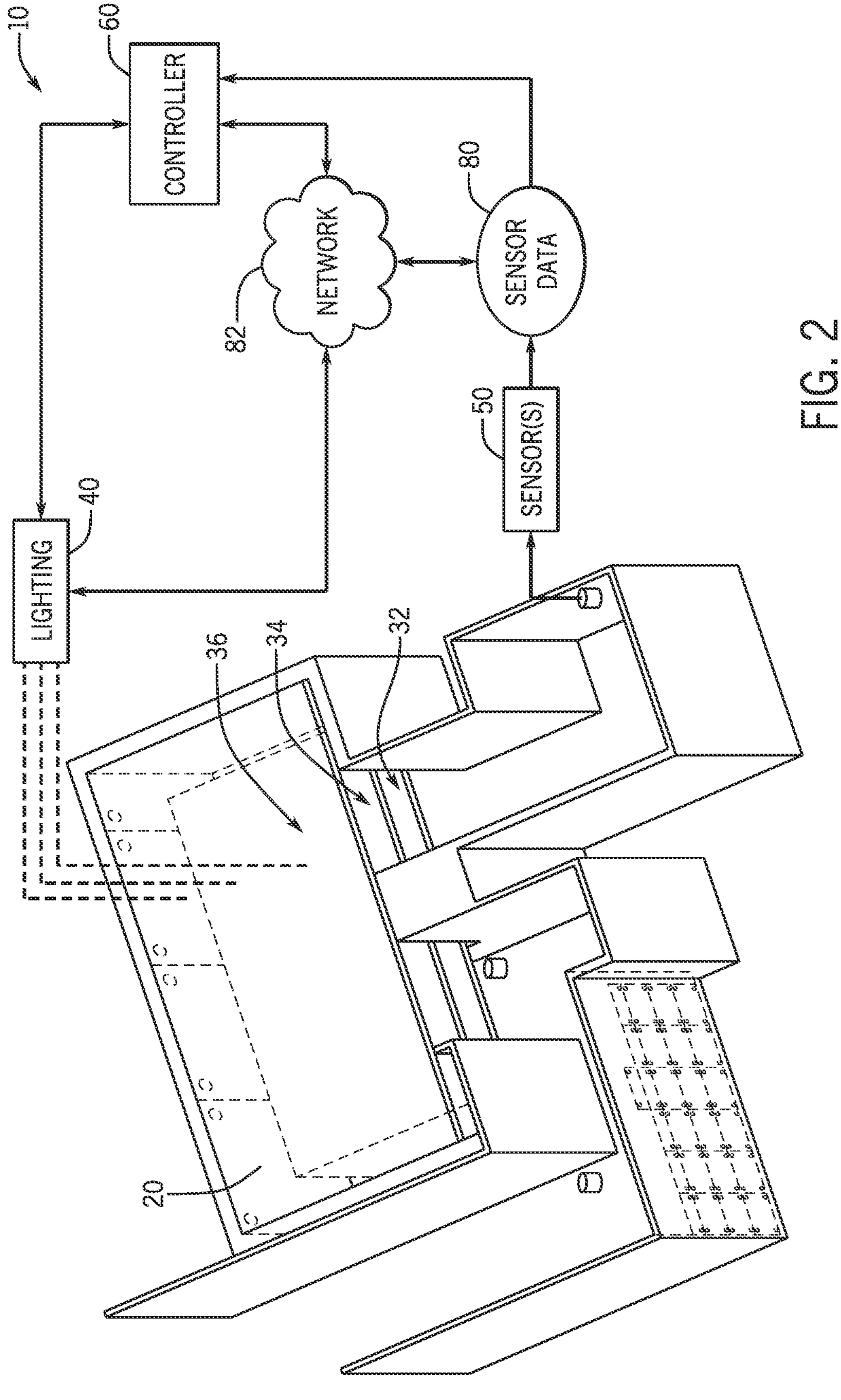
FIG. 2 is a perspective view of an embodiment of a shrinking or growing room system, such as that illustrated in FIG. 1, with overhead or roof portions illustrated, in accordance with an embodiment of the present disclosure.
Figure 3:
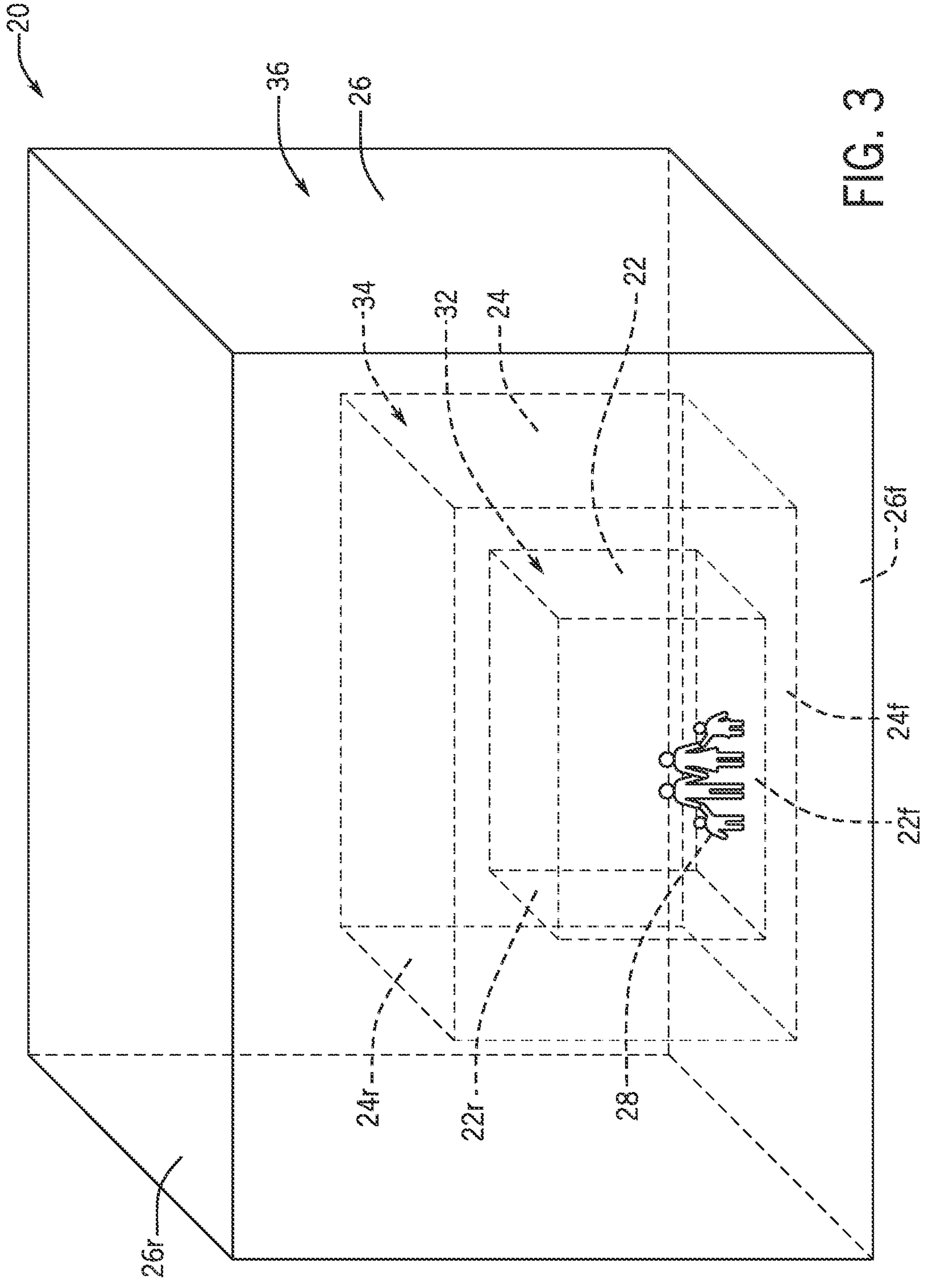
FIG. 3 is a schematic perspective view of an embodiment of nested rooms of a shrinking or growing room system, such as that illustrated in FIG. 1, illustrating an orientation of rooms relative to visitors in accordance with an embodiment of the present disclosure.
Figure 4:
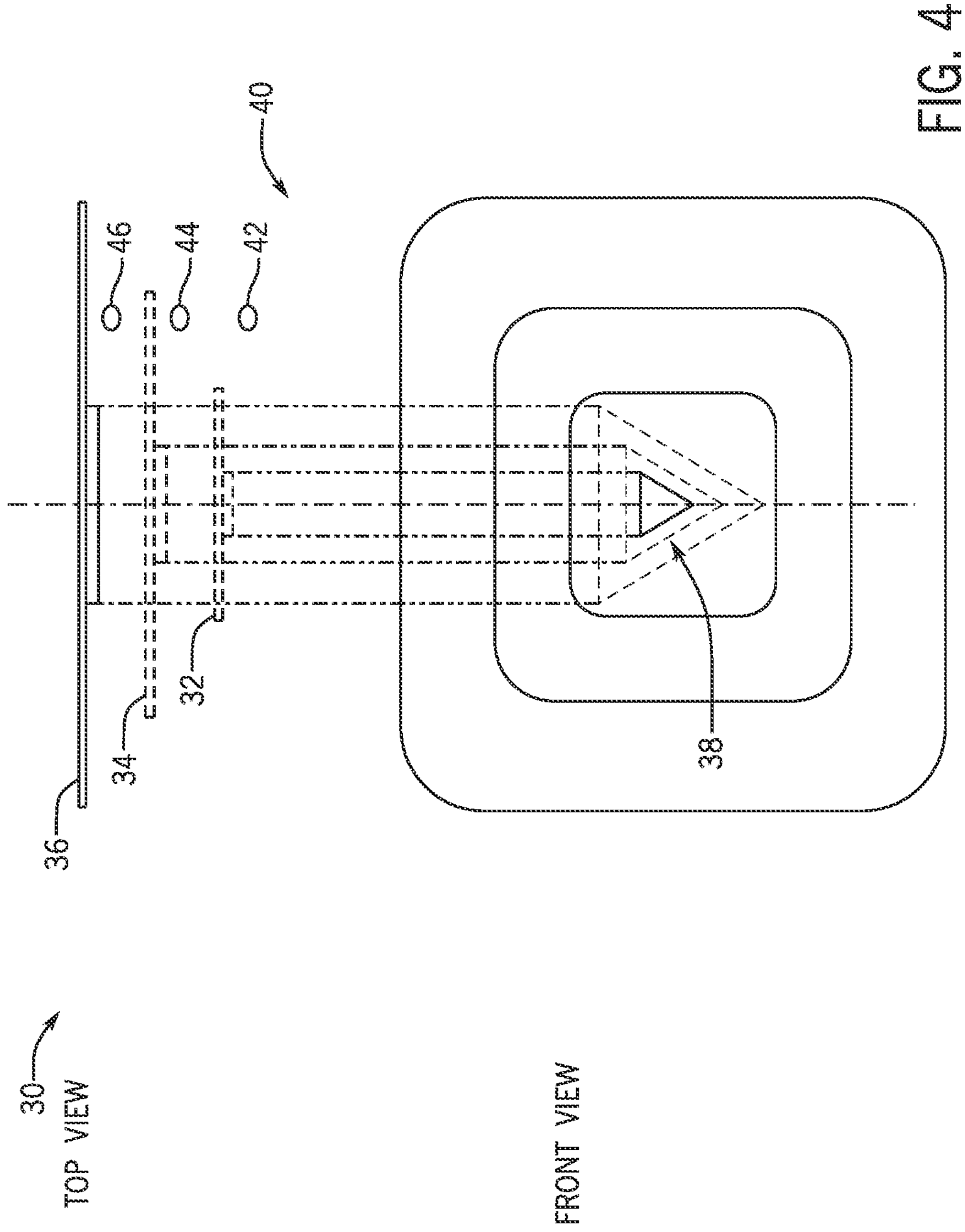
FIG. 4 includes a plan view and an elevational view of a portion of the groups of perforated optics panels of FIG. 1, in accordance with an embodiment of the present disclosure.

In accordance with present embodiments, a visual illusion of a size changing room may be achieved by controlling light sources to transition between illuminating the different groups of perforated optics panels referenced above. For example, FIGS. 1-4 illustrate certain embodiments of the size changing room. FIG. 1 illustrates an inside portion of a size changing room, FIG. 2 illustrates a size changing room with roofs, FIG. 3 illustrates a size changing room with visitors inside, and FIG. 4 illustrates a portion of a perforated optics panel with a graphic (e.g., a triangle). In the illustrated embodiments, three interior spaces are enclosed by three groups of panels. A first group of panels defines a first interior space, which is nested within a second interior space. A second group of panels defines the second interior space, which is nested within a third interior space that is defined by a third group of panels. In the illustrated embodiments, the first and second groups of panels each may include one or more perforated optics panels, and the third group of panels may include perforated or unperforated optics panel. Three light sources may be installed in the first, the second, and the third interior spaces respectively to illuminate each of the three groups of panels. The three light sources may be configured to illuminate the respective group of panels so that only one group of panels is illuminated relative to the visitors at a time. When the third group of panels is illuminated, the visitors inside the first interior space may see the illuminated third group of panels through the respective one or more perforated optics panels of the first group of panels and the second group of panels. The visitors may perceive the third interior space due to seeing the illuminated third group of panels. When the second group of panels is illuminated, the visitors inside the first interior space, the visitors may see the illuminated second group of panels through the one or more perforated optics panels on the first group of panels, and, thereby, perceive the second interior space. When the first group of panels is illuminated, the visitors inside the first interior space may see the illuminated first group of panels, and, thereby, perceive the first interior space. The visitors may perceive an interior space changing due to seeing different groups of panels. In the illustrated embodiment, the visitors may not need to see through the third group of panels and the third group of panels may not include any perforated optics panels. In other embodiments, more or fewer groups of panels may be used to define more or fewer interior spaces, and perforated optics panels may be included in each of them. In certain embodiments, a most outside group of panels may not include a perforated optics panel since the visitors may not need to see through the most outside group of panels.

Such perforated optics panels are often made out of vinyl and employed on windows of a room or vehicle to display advertisements to outside onlookers while allowing those inside to see out. Perforated vinyl (which is also known as "see-through vinyl" or "one-way vision film") is manufactured with evenly spaced holes spread throughout the film. The varieties of perforated vinyl are categorized by their ratio of printable area compared to the area that has been removed. The smaller the ratio, the greater the visibility to see through. For example, 65/35 means 65 percent of the material is printable while 35 percent is removed. Two of the most common types of perforated vinyl are 70/30 and 50/50. With a higher number, like a 70/30, the perforations are further apart from each other so the area has more coverage and more of the graphic can be seen. With a 50/50 type of perforated vinyl, printable area is equal to the area that has been removed, so the actual graphic can be seen but it also allows more light to come through. The type of material chosen is determined by the needs. Storefront windows usually use 30% to 35% perforation to allow for desired graphics viewability. Auto window perforation is typically 50% to facilitate visibility through the perforations from within the automobile. Perforation (e.g., hole or opening) diameter plays a role in one-way visibility and image quality. For the purpose of one-way vision, perforation diameter typically ranges from approximately 1.4 mm to 2 mm. The shape of perforations may be round or in other or more specific shapes (e.g. square, slot, oval), and the arrangements of the perforations may be straight or staggered. In accordance with present embodiments, the perforated optics panel may include embodiments with differing thicknesses and materials.

In particular, present embodiments are directed to nested rooms that are formed with perforated optics panels. Lighting of the nested rooms is controlled in a manner that causes a viewer (e.g., a viewer located within an innermost room) to perceive that a room is changing sizes based on which room is lighted and based on alignment of certain physical features between rooms. For example, a first group of perforated optics panels may be coupled with a roof to define a first room. First lighting may be configured to illuminate the first group of perforated optics panels. A second group of perforated optics panels may be coupled with a roof to define a second room, where the first room is nested within the second room. Second lighting may be configured to illuminate the second group of perforated optics panels (but limit or fully block light from reaching a visible portion of the first room). The lighting (e.g., first lighting and second lighting) may be designed so that only or substantially only one group of optics panels are illuminated at a time from the perspective of a viewer (e.g., a guest in an attraction).

The locations and dimensions of the graphics on the two groups of perforated optics panels may be designed to illustrate a room shrinking or growing effect. That is, the locations of the graphics on the two groups of perforated optics panels are configured to be aligned with respect to a view of a visitor inside the first room (e.g., an innermost room), and the dimensions of the graphics on the first group of perforated optics panels (panels of the innermost room) are in a same ratio but smaller than the dimensions of the corresponding graphics on the second group of perforated optics panels (panels on the room within which the first room is nested) and so forth, depending on the number of nested rooms. Thus, transitioning the lighting from illuminating the second group of perforated optics panels to illuminating the first group of perforated optics panels may cause an illusion of the graphics on the second group of perforated optics panels coming closer to the viewer and reducing in size due to the see-through effect of the perforated optics panels. This may give the impression that a room has shrunk relative to the graphics and positioning relative to the viewer. Further, the graphics on each of the corresponding panels of the nested rooms may transition in size such that the graphic on the innermost room is smaller than the corresponding graphic on the outermost room. This may give the impression that a graphic has shrunk along with the corresponding panel relative to the viewer when lighting transitions from illuminating outer panels to illuminating inner panels. Likewise, a viewer may perceive that a graphic has grown along with the corresponding panel when lighting transitions from illuminating inner panels to illuminating outer panels. The adjusted graphic sizes and room sizes in conjunction may cause a viewer to perceive that a single room has changed sizes and that graphics on the walls of the room have likewise changed sizes as the lighting causes the viewer to focus on particular rooms of the nested rooms. It should also be noted that a viewer may perceive that the viewer has grown or shrank within the same room. In other words, the viewer may perceive that the room has changed size relative to the person because the person perceives he or she has grown or shrank.

As an example of how present embodiments may operate, we shall discuss a scenario in which a visitor walks or rides (e.g., on a ride vehicle) into a size changing room system. One or more sensors (e.g. motion sensor, position sensor, weight sensor, light sensor, sound sensor) may be distributed in one or more locations to detect the visitor's presence within, proximate to, or a predetermined distance from the size changing room. A controller may receive a trigger signal from the one or more sensors. After determining that the visitor is coming into or has entered the size changing room, the controller may set (e.g., reset) the lighting of the perforated optics panels to a particular setup, which may depend on whether a shrinking or growing effect is desired. For example, the controller may operate second lighting to illuminate a second group of perforated optics panels and deactivate first lighting that is positioned to illuminate a first group of optics panels within the second group (e.g., nested within and closer to the viewer than the second group). After a predetermined period of time, the controller may transition the lighting to illuminate the first group of perforated optics panels and not the second group of perforated optics panels. The controller may receive additional data to initiate the transition between illuminating the second group of perforated optics panels and the first group of perforated optics panels. For an example, the controller may receive data (e.g., sound data, lighting data, or a combination of sound and lighting data) and initiate the transition between illuminating the second group of perforated optics panels and the first group of perforated optics panels based on such data to enhance a shrinking or growing effect. The controller may control lighting (e.g., the first lighting and/or the second lighting) to flash (e.g., create a strobe effect) while transitioning between illuminating the first group of perforated optics panels and illuminating the second group of perforated optics panels to create disorientation. This disorientation may be useful in hiding the basis of the illusion from a viewer. The viewer may thus only notice that a change occurred and that what was previously viewed to be a room of a certain size has transitioned to a smaller or larger room. The controller may store additional data in a storage. The controller may combine the additional data in a predetermined combination. Thus, the size changing room may be operated to improve a visitor's experience and support a particular narrative of the environment. Different types of transitions may be provided based on previous activity of the viewer. For example, if the viewer selected a particular option as part of the ride or the ride vehicle passed along a particular path, the room may be operated to provide a shrinking illusion instead of a growing illusion.

In an embodiment, one or more additional effects may be employed to create additional sensory effects (e.g. temperature, vibration, smell) along with the illusion of transition in room size. The controller may operate additional devices or sensors and/or receive additional signals (e.g. by communicating through network) to work with the transition between illuminating the second group of perforated optics panels and the first group of perforated optics panels in order to improve a visitor's experience and support a particular narrative of the environment. For example, the shrinking room may be a part of a story or scene, and it may be controlled to operate in a predetermined pattern with other attractions in the amusement park.

FIGS. 1 and 2 are perspective views of a system 10 that includes nested rooms 20 that coordinate to facilitate a size changing room effect using groups of perforated optics panels 30, lighting 40, sensors 50, and a controller 60 in accordance with an embodiment of the present disclosure. In FIG. 1, roofs for the size changing rooms are not shown to facilitate viewing of an inside portion 12 of the system 10. The inside portion 12 may be defined by and/or include aspects of the system 10, such as the perforated optics panels 30, the lighting 40, the sensors 50, the controller 60, and so forth. Further, the system 10 may include network features that facilitate data communication within the system 10 and with exterior devices. For example, the sensors 50 may collect sensor data 80 (e.g., image data, video data, sound data, location data, and weight data), which may be transmitted to the controller 60 through a network 82. Further, external data (e.g., data about a particular user) may be gathered from a remote system and transmitted to the controller 60 via the network 82. However, in some embodiments, data may be transmitted directly from the sensors 50 to the controller 60. Indeed, the controller 60 may communicate with the sensors or other devices directly and/or through the network 82 in accordance with present embodiments.

The sensors 50 may comprise a motion sensor, a position sensor, a weight sensor, a sound sensor, a light sensor, an image sensor, or any combination thereof to detect a presence of a ride vehicle or a guest entering or positioned within a predetermined distance of the nested rooms 20. The controller 60 may receive a trigger signal from the sensors 50 or from some other devices, either directly or through the network 82. After determining that the ride vehicle or the guest is coming into or has entered the nested rooms 20, the controller 60 may set the lightings 40 to a particular setup to initiate a room shrinking or growing effect.

FIGS. 2 and 3 include views that provide additional visual context for the system 10. FIG. 2 is a perspective view of an embodiment of the system 10 wherein ceiling or roof portions of the nested rooms 20 are illustrated. FIG. 3 is a schematic perspective view of an embodiment of the nested rooms 20 with a first room 22, a second room 24, and a third room 26, wherein visitors 28 are shown inside the first room 22, which is defined by a first group of the perforated optics panels 32, including perforated optics panels that define a roof portion **22*r* and a flooring portion 22*f*. The second room 24 is defined by a second group of the perforated optics panels 34 with a roof portion 24*r* and a flooring portion 24*f*, and the third room 26 is defined by a third group of the perforated optics panels 36 (the details of the groups of the perforated optics panels are illustrated in FIG. 4) with a roof portion 26*r* and a flooring portion 26*f*. Although the embodiment in FIG. 3 illustrates flooring portions 22*f*, 24*f*, and 26*f* of the nested rooms 20 in a common plane, it should be understood that the floorings could also be adjusted in position such that illumination of certain areas provide an illusion of floating. Further, the groups of perforated optics panels 30 may be located on or define any of one or more walls, floors, or roofs of the nested rooms 20 while opaque or other materials may define others. Indeed, the room growing or shrinking effect may be created by various combinations of the groups of perforated optics panels 30** and/or opaque material on walls, floors, or roofs. In certain embodiments, asymmetric growing or shrinking illusions may be provided by making certain barriers (e.g., walls, flooring, ceiling, roof) opaque or by only adjusting lighting for particular sides.

FIG. 4 illustrates an embodiment in which the controller 60 may set the lighting 40 to initiate or proceed with a room shrinking or growing effect relative to the viewer inside the room. Three groups of the perforated optics panels 30 are shown in FIG. 4. Graphics 38 on the three groups of perforated optics panels 30 may be arranged to be aligned with respect to a view of a visitor inside the first room defined by the first group of perforated optics panels 32. Dimensions of the graphics on the first group of perforated optics panels 32 may be in a same ratio but smaller than dimensions of the corresponding graphics on the second group of perforated optics panels 34. The dimensions of the graphics on the second group of perforated optics panels 34 may be in a same ratio but smaller than the dimensions of the corresponding graphics on the third group of perforated optics panels 36. The visitors 28 inside the first room 22 defined by the first group of perforated optics panels 32, which is nested inside the second room 24 defined by the second group of perforated optics panels 34 (which is nested inside the third room 26 defined by the third group of perforated optics panels 36), may perceive that a graphic has shrunk when lighting transitions from operating third lighting 46 to illuminate the third group of perforated optics panels 36 to operating second lighting 44 to illuminate the second group of perforated optics panels 34, then from operating second lighting 44 to illuminate the second group of perforated optics panels 34 to operating first lighting 42 to illuminate the first group of perforated optics panels 32. Thus, the adjusted graphic sizes and room sizes in conjunction may cause a visitor to perceive that the graphic is coming closer and that a single room has shrank. Likewise, a viewer may perceive that the graphic is going farther away and growing bigger and that a single room has grown relative to the visitors 28 inside the first room 22 when lighting transitions from illuminating inner panels to illuminating outer panels. The adjusted graphic sizes and room sizes in conjunction may cause a viewer to perceive that a single room has changed sizes and that graphics on the walls of the room have likewise changed sizes relative to the viewer as the lighting causes the viewer to focus on particular rooms of the nested rooms. It should also be noted that a viewer may perceive that the viewer has grown or shrank within the same room. In some embodiments, the graphic sizes may be designed in a way so that the adjusted graphic sizes and room sizes in conjunction may cause a viewer to perceive that a single room has collapsed (e.g., the graphic sizes do not change with the room sizes). In these embodiments, a viewer may perceive that the space inside the room has grown or shrank, and the viewer may not perceive that the viewer has grown or shrank within the same room because graphics on the perceived walls remain a substantially constant size.

Figure 5:
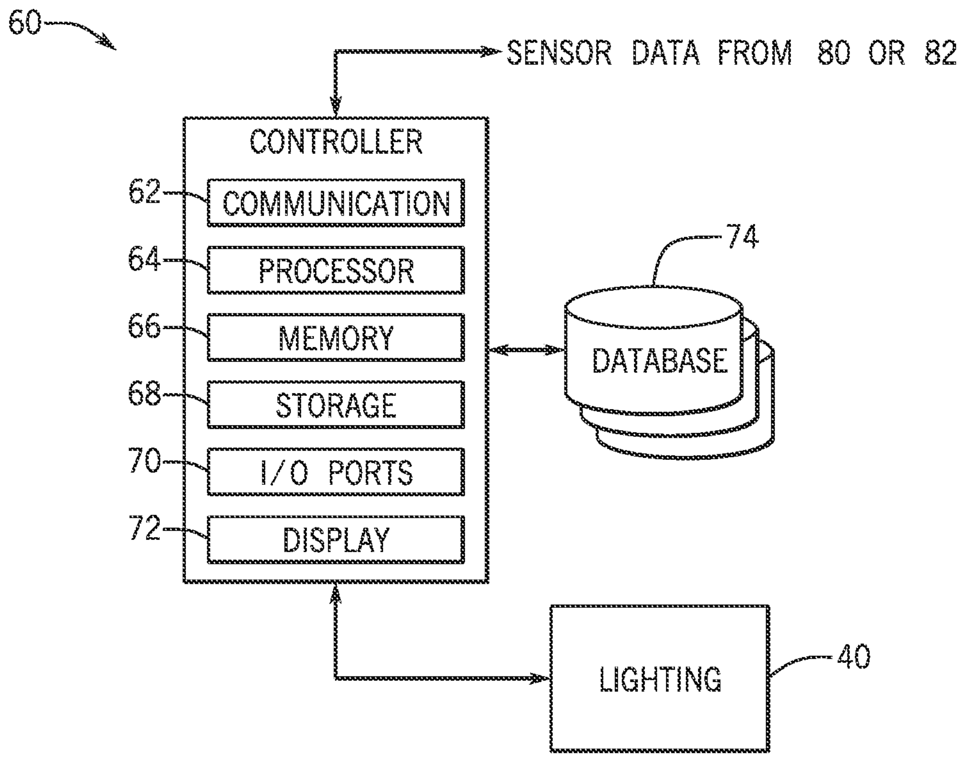
FIG. 5 is a block diagram of a controller that may be used in the shrinking or growing room system of FIG. 1, in accordance with an embodiment of the present disclosure.

FIG. 5 is a block diagram of the controller 60, in accordance with an embodiment of the present disclosure. The controller 60 may include various types of components that may assist the controller 60 in performing various types of computer tasks and operations. For example, the controller 60 may include a communication component 62, a processor 64, a memory 66, a storage 68, input/output (I/O) ports 70, a display 72, and the like.

The communication component 62 may be a wireless or wired communication component that may facilitate communication between the controller 60 and various other controllers and devices via a network, the internet, or the like. For example, the communication component 62 may allow the controller 60 to obtain the data from the variety of data sources, such as sensor data 80, network 82, databases 74, and the like. The communication component 62 may use a variety of communication protocols, such as Open Database Connectivity (ODBC), TCP/IP Protocol, Distributed Relational Database Architecture (DRDA) protocol, Database Change Protocol (DCP), HTTP protocol, other suitable current or future protocols, or combinations thereof.

The processor 64 may process instructions for execution within the controller 60. The processor 64 may include single-threaded processor(s), multi-threaded processor(s), or both. The processor 64 may process instructions stored in the memory 66. The processor 64 may also include hardware-based processor(s) each including one or more cores. The processor 64 may include general purpose processor(s), special purpose processor(s), or both. The processor 64 may be communicatively coupled to other internal components (such as the communication component 62, the storage 68, the I/O ports 70, and the display 72).

The memory 66 and the storage 68 may be any suitable articles of manufacture that can serve as media to store processor-executable code, data, or the like. These articles of manufacture may represent computer-readable media (e.g., any suitable form of memory or storage) that may store the processor-executable code used by the processor 64 to perform the presently disclosed techniques. As used herein, applications may include any suitable computer software or program that may be installed onto the controller 60 and executed by the processor 64. The memory 66 and the storage 68 may represent non-transitory computer-readable media (e.g., any suitable form of memory or storage) that may store the processor-executable code used by the processor 64 to perform various techniques described herein. It should be noted that non-transitory merely indicates that the media is tangible and not a signal.

The I/O ports 70 may be interfaces that may couple to other peripheral components such as input devices (e.g., keyboard, mouse), sensors, input/output (I/O) modules, and the like. The display 72 may operate as a human machine interface (HMI) to depict visualizations associated with software or executable code being processed by the processor 64. In one embodiment, the display 72 may be a touch display capable of receiving inputs from an operator of the controller 60. The display 72 may be any suitable type of display, such as a liquid crystal display (LCD), plasma display, or an organic light emitting diode (OLED) display, for example. Additionally, in one embodiment, the display 72 may be provided in conjunction with a touch-sensitive mechanism (e.g., a touch screen) that may function as part of a control interface for the controller 60.

It should be noted that the components described above with regard to the controller 60 are examples and the controller 60 may include additional or fewer components relative to the illustrated embodiment.

Figure 6:
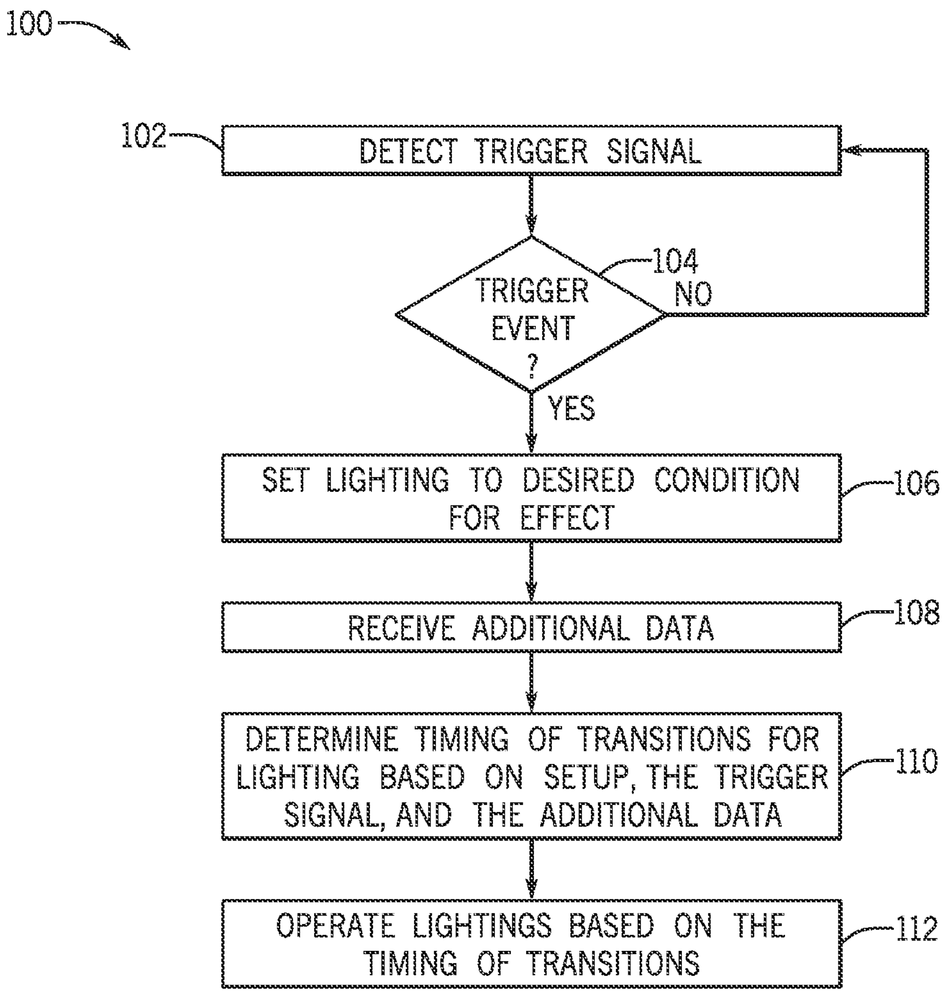
FIG. 6 is a flow chart of a method for performing a shrinking or growing room illusion, in accordance with an embodiment of the present disclosure.

FIG. 6 is a flow chart of a method 100 for performing a shrinking or growing room illusion in an embodiment. At block 102, the controller 60 may detect a trigger signal (e.g. from sensors 50 or other devices). After determining that a trigger event (e.g. a ride vehicle or a guest entering or positioned within a predetermined distance of the size changing room) has occurred based on the trigger signal, at block 104, the controller 60 may set the lightings 40 to a particular setup (block 106), which may depend on whether a shrinking or growing effect is desired. At block 108, the controller 60 may receive additional data (e.g., sound data, lighting data, vibration data, temperature data, or other data, or any combination) to determine the timing of transitions for lighting (block 110). The controller 60 may operate the lighting based on the timing of transitions at block 112.

Figure 7:
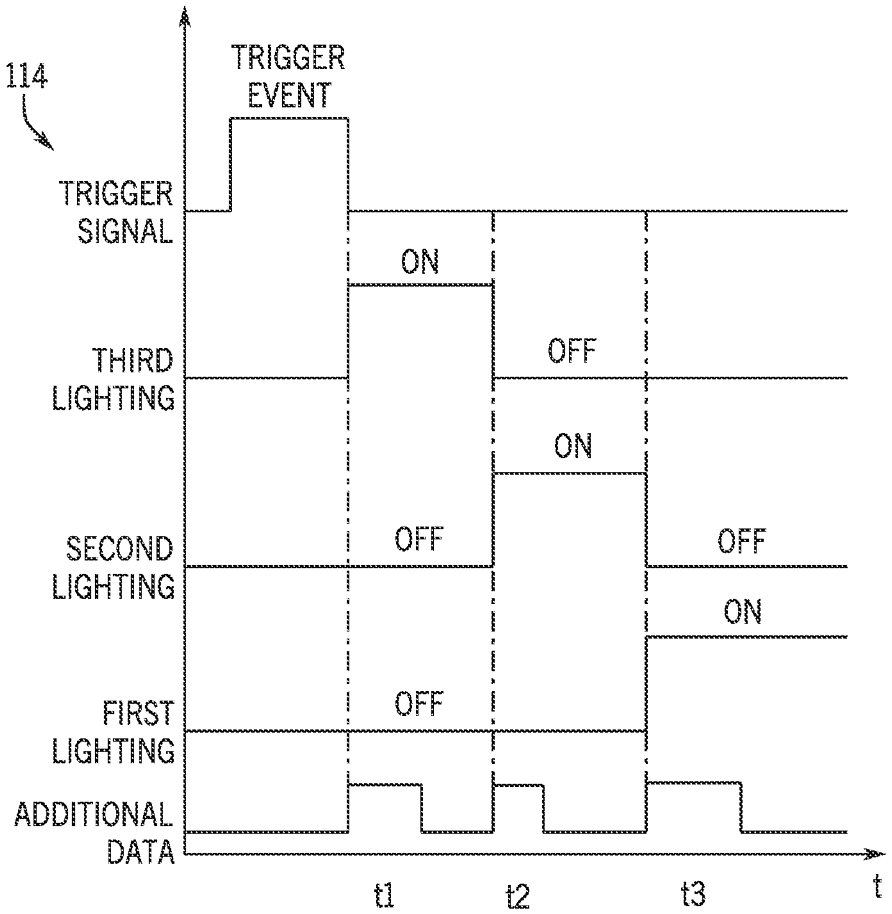
FIG. 7 is a plot of a timing of transitions that includes a trigger signal, lighting signals, and additional data, in accordance with an embodiment of the present disclosure.

FIG. 7 is a plot 114 of a timing of transitions that includes a trigger signal, lighting signals, and additional data for an embodiment. In the plot, t1, t2, and t3 are time instances corresponding to the timing of transitions. The timing of transitions may be determined by the controller 60 based on a particular initial setup, the trigger signal, and the additional data at block 110. For example, t1 may be determined by the controller 60 based on the trigger signal, the particular initial setup to illustrate a room growing/shrinking effect, and the additional data (e.g., sound data, lighting data, vibration data, temperature data, or other data, or any combination) to enhance the growing/shrinking effect. For example, at t1, the controller 60 may operate third lighting 46 to illuminate the third group of perforated optics panels 36 while keeping the first lighting 42 and the second lighting 44 deactivated (i.e. off), and, at the same time, additional sound data (or lighting data, vibration data, temperature data, or other data, or any combination) may make special effects at t1 to enhance the transition effect. At t2, the controller 60 may operate second lighting 44 to illuminate the second group of perforated optics panels 34 while keeping the first lighting 42 and the third lighting 46 deactivated (i.e. off), and, at the same time, additional sound data (or lighting data, vibration data, temperature data, or other data, or any combination) may make special effects at t2 to enhance the transition effect. At t3, the controller 60 may operate first lighting 42 to illuminate the first group of perforated optics panels 32 while keeping the second lighting 44 and the third lighting 46 deactivated (i.e. off), and, at the same time, additional sound data (or lighting data, vibration data, temperature data, or other data, or any combination) may make special effect at t3 to enhance the transition effect.

It should be understood that the discussion herein of first and second groups of optical panels in first and second nested rooms is non-limiting. The groups of perforated optics panels (or rooms) may be more than two. Indeed, multiple nested rooms (groupings of optical panels) are contemplated and the transitions (e.g., lighting transitions) referenced between first and second rooms or optical panels should be considered to broadly include transitioning between any of various and multiple rooms. Such transitions may be performed in either direction (e.g., outwardly or inwardly). For example, control of the transition between illuminating a second group of perforated optics panels to illuminating a first group of perforated optics panels nested within the second group to achieve a shrinking room effect may be reversed to achieve an expanding room effect. The groups of perforated optics panels may be located not only on the walls of the rooms but should also be considered to broadly include the roofs or floors of the rooms. Further, the shapes of the rooms defined by the groups of perforated optics panels may be of different 3-D dimensional shapes (e.g. ellipsoidal space, in which the walls, floors, or roofs may not be clearly separated).

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system for performing a size changing room illusion, the system comprising:

a first group of perforated optics panels defining a first interior space;

a first lighting configured to illuminate the first group of perforated optics panels from the first interior space;

a second group of panels defining a second interior space, wherein the first group of perforated optics panels are nested within the second interior space;

a second lighting configured to illuminate the second group of panels from within the second interior space and positioned beyond the first interior space; and a controller configured to control the first lighting and the second lighting to transition between illuminating the first group of perforated optics panels and illuminating the second group of panels such that a visual illusion of transitioning between the first interior space and the second interior space is provided.

2. The system of claim 1, wherein the first lighting comprises a first plurality of light emitting diodes and the second lighting comprises a second plurality of light emitting diodes.

3. The system of claim 1, comprising one or more sensors configured to generate a trigger signal to trigger the controller to initiate the transition between illuminating the first group of perforated optics panels and the second group of panels.

4. The system of claim 3, wherein the one or more sensors comprise a motion sensor, a position sensor, a weight sensor, a sound sensor, a light sensor, an image sensor, or any combination thereof configured to detect a presence of a ride vehicle or a guest entering or positioned within the first interior space.

5. The system of claim 1, wherein the first group of perforated optics panels comprises four side walls and a roof coupled together to define a room.

6. The system of claim 1, comprising:

a third panel grouping defining a third interior space, wherein the second group of panels comprises perforated optics panels and is disposed within the third interior space; and a third lighting configured to illuminate the third panel grouping from within the third interior space and positioned beyond the first interior space and the second interior space.

7. The system of claim 6, wherein the third panel grouping comprises a third group of perforated optics panels.

8. The system of claim 1, wherein the second group of panels comprises a second graphic thereon that aligns with and is bigger than a first graphic on the first group of perforated optics panels.

9. The system of claim 1, wherein the controller is configured to activate the first lighting, then deactivate the first lighting, and then activate the second lighting to transition from illuminating the first group of perforated optics panels to illuminating the second group of panels such that a visual illusion of transitioning from the first interior space to the second interior space is provided.

10. The system of claim 1, wherein the controller is configured to activate the second lighting, then deactivate the second lighting, and then activate the first lighting to transition from illuminating the second group of panels to illuminating the first group of perforated optics panels such that a visual illusion of transitioning from the second interior space to the first interior space is provided.

11. The system of claim 1, wherein the first group of perforated optics panels comprises a one-way perforated vinyl layer.

12. The system of claim 1, wherein the controller is configured to control the first lighting and the second lighting to flash while transitioning between illuminating the first group of perforated optics panels and illuminating the second group of panels to create disorientation.

13. The system of claim 1, wherein the controller is configured to receive an additional data, wherein the controller controls the transition between illuminating the first group of perforated optics panels and the second group of panels based on the additional data.

14. The system of claim 13, wherein the additional data comprises a sound signal, a light signal, a vibration signal, a temperature signal, or any combination thereof.

15. A method for performing a shrinking room illusion, the method comprising:

using a first lighting to illuminate a first group of perforated optics panels, wherein the first group of perforated optics panels defines a first interior space, and wherein the first lighting is disposed within the first interior space;

using a second lighting to illuminate a second group of panels, wherein the second group of panels defines a second interior space, wherein the first group of perforated optics panels are nested within the second interior space, and wherein the second lighting is disposed within the second interior space and beyond the first interior space; and using a controller to control the first lighting and the second lighting to transition between illuminating the first group of perforated optics panels and illuminating the second group of panels such that a visual illusion of transitioning between the first interior space and the second interior space is provided.

16. The method of claim 15, comprising receiving a trigger signal from one or more sensors, wherein the trigger signal is used to trigger the controller to initiate the transition between illuminating the first group of perforated optics panels and the second group of panels.

17. The method of claim 16, wherein the one or more sensors comprise a motion sensor, a position sensor, a weight sensor, a sound sensor, a light sensor, or any combination thereof configured to detect a presence of a ride vehicle or a guest entering or positioned within the first interior space.

18. The method of claim 15, comprising receiving an additional data, wherein the controller controls the transition between illuminating the first group of perforated optics panels and the second group of panels based on the additional data.

19. The method of claim 15, comprising using a third lighting to illuminate a third panel grouping, wherein the third panel grouping defines a third interior space, wherein the second group of panels are nested within the third interior space, and wherein the third lighting is disposed within the third interior space and beyond the second interior space.

20. A non-transitory computer-readable storage medium coupled to one or more processors and having instructions stored thereon which, when executed by the one or more processors, cause the one or more processors to perform operations comprising:

using a first lighting to illuminate a first group of perforated optics panels, wherein the first group of perforated optics panels defines a first interior space, and wherein the first lighting is located in the first interior space;

using a second lighting to illuminate a second group of panels, wherein the second group of panels defines a second interior space, wherein the first group of perforated optics panels are nested within the second interior space, and wherein the second lighting is located in the second interior space and beyond the first interior space; and using a controller to control the first lighting and the second lighting to transition between illuminating the first group of perforated optics panels and illuminating the second group of panels such that a visual illusion of transitioning between the first interior space and the second interior space is provided.

* * * * *